(12) United States Patent
Kimura

(10) Patent No.: US 8,466,906 B2
(45) Date of Patent: Jun. 18, 2013

(54) OPTICAL MODULATION APPARATUS

(75) Inventor: Kenichiro Kimura, Tokorozawa (JP)

(73) Assignee: Citizen Holdings Co., Ltd., Nishitokyo-shi (JP)

(*) Notice: Subject to any disclaimer, the term of this patent is extended or adjusted under 35 U.S.C. 154(b) by 760 days.

(21) Appl. No.: 12/410,108

(22) Filed: Mar. 24, 2009

(65) Prior Publication Data

US 2009/0237380 A1 Sep. 24, 2009

(30) Foreign Application Priority Data

Mar. 24, 2008 (JP) ................................ 2008-075635

(51) Int. Cl.
*G09G 5/00* (2006.01)

(52) U.S. Cl.
USPC ......................................................... 345/205

(58) Field of Classification Search
None
See application file for complete search history.

(56) References Cited

U.S. PATENT DOCUMENTS 6,177,968 B1 * 1/2001 Okada et al. ..................... 349/38

FOREIGN PATENT DOCUMENTS

JP 62169120 A 7/1987

* cited by examiner

*Primary Examiner* — K. Wong
(74) *Attorney, Agent, or Firm* — The Webb Law Firm

(57) ABSTRACT

An optical modulation apparatus includes a light irradiation section, a plurality of rectangular pixel electrodes arranged on two lines separately at regular intervals in such a manner that short sides of adjacent pixel electrodes face each other and drive an optical modulation substance; a driver element is disposed below the pixel electrode and drives the pixel electrode; and a pixel electrode connection that electrically connects the pixel electrode and the driver element, wherein the pixel electrode connection is disposed outside the light irradiation section.

9 Claims, 9 Drawing Sheets (a)

Prior Art

OPTICAL MODULATION APPARATUS

TECHNICAL FIELD

The present invention relates to a technique for improving the reflection characteristics of an optical modulation apparatus. More specifically, the present invention relates to an optical modulation apparatus in which a liquid crystal is used as an optical modulation substance.

BACKGROUND ART

An optical modulation apparatus is an apparatus for adjusting a time in which a voltage is applied to a liquid crystal that is an optical modulation substance corresponding to prescribed data and for modifying the characteristics of transmitting lights by changing the torsion of a liquid crystal. The optical modulation apparatus is used mainly for an optical communication apparatus.

There are many kinds of liquid crystal panels that configure the optical modulation apparatus. One of them is called LCOS (Liquid Crystal on Silicon). The LCOS is provided with a structure in which a liquid crystal is disposed directly on a semiconductor substrate and bookended between transparent electrode and pixel electrode.

For the LCOS, a liquid crystal is disposed directly on a pixel electrode formed on the semiconductor substrate and is sealed. In the case of the LCOS, the pixel electrode formed on the semiconductor substrate is used as both of a reflecting plate and an electrode. Consequently, it is enough for a light to transmit one transparent electrode only, thereby improving a transmission factor.

Moreover, in the case of the LCOS, a wire can be disposed under the pixel electrode. Therefore, an aperture ratio of each pixel can also be improved by a width of the wire.

As described above, the LCOS has a high transmission factor and a high aperture ratio. Consequently, the LCOS has been started to be used for an optical modulation apparatus, a display and so on. In keeping with this trend, a lot of techniques related to the LCOS have been proposed (for instance, see Patent document 1).

A conventional art disclosed in Patent document 1 will be explained below. The conventional art disclosed in Patent document 1 is provided with a typical LCOS structure. A plurality of pixel electrodes are arranged on one plane, and a prescribed voltage is applied to each pixel electrode by a driver element. The pixel electrode and the driver element are connected to each other via a contact hole and a via hole.

Moreover, a light shielding layer for preventing a light from being applied to the driver element is disposed between the pixel electrode and the driver element to prevent a malfunction of the driver element.

Patent document 1: Japanese Patent Application Laid-open Publication No. 62 (1987)-169120 (Page 2, FIG. 1)

The conventional art disclosed in Patent document 1 shows a typical LCOS structure, and can also be used for a panel of an optical modulation apparatus. The present inventor has examined the case in which the conventional art disclosed in Patent document 1 is used for an optical modulation apparatus having a large pixel region, that is, a large light irradiation section.

In other words, the present inventor has examined the case in which the above described LCOS is used for an optical modulation apparatus that configures a TODC (Tunable Optical Dispersion Compensator).

Such a tunable optical dispersion compensator (TODC) will be explained below with reference to FIG. 7.

In FIG. 7, a numeral 100 indicates a tunable optical dispersion compensator (TODC) in the whole of the configuration.

In an optical communication field, optical data of a plurality of wavelengths are transmitted collectively through one optical fiber 102 to gain a bandwidth. However, a transmission of a long distance causes a phase of each wavelength to be misaligned.

Consequently, for the tunable optical dispersion compensator 100, lights that have transmitted through the optical fiber 102 are transmitted through a branching filter 104 to be separated for every wavelength by the branching filter 104. The lights separated for every wavelength by the branching filter 104 are then reflected to an LCOS 108 via an optical lens 106. A pixel electrode group of the LCOS 108 is then operated selectively to align a phase of each wavelength.

However, in the case in which the LCOS is used for the optical modulation apparatus, it is found that a shadow is generated in a pixel region to cause a reflection of a light to be nonuniform disadvantageously as described in the following.

In addition, in the case in which a high-intensity light is irradiated, a light leaks from a hole in a slit shape located around a pixel electrode connection to result in a malfunction of the driver element in some cases.

[Explanation of Problems: FIGS. 8 and 9]

With reference to figures, the following describes problems that occur in the case in which the conventional art disclosed in Patent document 1 examined by the present inventor is used for an optical modulation apparatus having a large pixel region. FIG. 8 is a schematic view for illustrating an LCOS having a large pixel region. FIG. 8(a) is a plan view, and FIG. 8(b) is a cross-sectional view taken along the line B-B' of FIG. 8(a). FIG. 9 is a plan view schematically illustrating a display region shown in FIG. 8.

In FIGS. 8(a) and 8(b), a numeral 200 indicates an optical modulation apparatus in which an LCOS of a conventional art is used in the whole of the configuration.

In the optical modulation apparatus 200, a gate electrode 204 is formed on a substrate 202 made of a semiconductor substrate, and a drain region 206 and a source region 208 are formed around the gate electrode 204. The gate electrode 204, the drain region 206, and the source region 208 configure a driver element 210 of a MOS type transistor.

The driver elements 210 of MOS type transistors are electrically insulated and isolated by an element isolation region 212, and are electrically insulated and isolated by interlayer insulation films 214 and 216.

An optical protective film (a light shielding layer) 218 is formed on the upper surface of the interlayer insulation film 216, and a pixel electrode 222 is formed on the upper surface of the optical protective film (the light shielding layer) 218 via an interlayer insulation film 220.

The pixel electrode 222 and the driver element 210 disposed below the pixel electrode 222 are electrically connected to each other. That is to say, a wire 211 of the driver element 210 and the lower surface of the pixel electrode 222 are electrically connected to each other via a pixel electrode connection 224.

In this case, the pixel electrode connection 224 penetrates through a hole formed in the optical protective film (the light shielding layer) 218. A gap is formed between the pixel electrode connection 224 and an opening part formed in the optical protective film (the light shielding layer) 218. A slit 226 is formed around the pixel electrode connection 224.

Moreover, a final protective film 228 is formed on the upper surface of the pixel electrode 222, and a liquid crystal layer 229 is formed via the final protective film 228. A counter electrode (a transparent electrode) (not shown) is formed on the upper surface of the liquid crystal layer 229.

As shown in FIG. 8(a), the pixel electrode 222 is a rectangular electrode having a long side 222a and a short side 222b. The pixel electrodes 222 are arranged on two lines separately at regular intervals in such a manner that short sides 222b of adjacent pixel electrodes 222 face each other. Lights are irradiated to a region in which the pixel electrodes 222 are disposed. The area can be determined without any inhibition depending on the specifications of the optical modulation apparatus.

The area is composed of a plurality of pixel electrodes 222, and configures a light irradiation section 230 as shown in FIGS. 8(a) and 9.

For the pixel electrode 222, a size of the light irradiation section 230 is determined depending on the conditions of the optical system of an instrument in which the optical modulation apparatus is installed in a practical sense. In addition, the number of pixel electrodes 222 and the sizes of a long side 222a and a short side 222b are also determined. Consequently, a size of the pixel electrode 222 is extremely enlarged in some cases. For instance, a long side 222a is 1 mm and a short side 222b is 5 µm.

In the example shown in FIG. 8, the sizes of a long side 222a and a short side 222b are modified, and eight pixel electrodes 222 are arranged to improve visualization of the figure. FIG. 9 is a plan view for illustrating the entire of the light irradiation section 230.

As shown in FIG. 8, since the pixel electrodes 222 are arranged in an orderly fashion, the pixel electrode connections 224 for connecting the pixel electrode 222 and the driver element 210 to each other are also arranged in an orderly fashion, thereby configuring lines 232 of the pixel electrode connections 224.

Consequently, in the case in which the entire of the light irradiation section 230 is seen, a linear shadow 234 caused by the lines 232 of the pixel electrode connections 224 is generated as shown in FIG. 9.

In particular, an influence of the shadow cannot be ignored in a field that requires the reflection characteristics of high grade such as an optical communication field.

Moreover, a slit 226 is formed around the pixel electrode connection 224. The slit 226 is a slight opening portion of the optical protective film (the light shielding layer) 218 for a connection to the driver element 210.

The driver element 210 is located directly below the slit 226. Consequently, in the case in which a high-intensity light is irradiated, the light enters forcibly the slit 226, thereby resulting in a malfunction of the driver element 210 in some cases.

Therefore, in the case in which the conventional art disclosed in Patent document 1 is used for an optical modulation apparatus, in particular, an optical modulation apparatus having a large sized light irradiation section, a linear shadow is generated in the light irradiation section, thereby causing nonuniformity of a reflection. In the case in which a higher-intensity light is irradiated, a malfunction of the driver element occurs in some cases.

The present invention was made in order to solve the above problems of the conventional art. An object of the present invention is to provide an optical modulation apparatus that does not cause both of nonuniformity of a reflection and a malfunction of the driver element even in the case in which an area of the light irradiation section is large.

SUMMARY OF THE INVENTION

The present invention was made in order to solve the above problems of the conventional art and to achieve the purpose.

An optical modulation apparatus in accordance with the present invention is characterized by comprising:

a light irradiation section;

a plurality of rectangular pixel electrodes that are arranged on two lines separately at regular intervals in such a manner that short sides of adjacent pixel electrodes face each other and that drive an optical modulation substance;

a driver element that is disposed below the pixel electrode and that drives the pixel electrode; and a pixel electrode connection that electrically connects the pixel electrode and the driver element, wherein the pixel electrode connection is disposed outside the light irradiation section.

By the above configuration, the pixel electrode connections for electrically connecting the pixel electrode and the driver element are disposed outside the light irradiation section. Consequently, a linear shadow caused by the pixel electrode connection is not generated unlike the conventional art, and nonuniformity of a reflection does not occur, thereby enabling a light to be reflected uniformly.

Moreover, a malfunction of the driver element caused by a leak of a light from a part around the pixel electrode connection can be prevented.

As a result, a phase of each wavelength can be aligned with precision, and an optical transmission can be reliably carried out as an optical modulation apparatus.

The optical modulation apparatus in accordance with the present invention is characterized in that the pixel electrode connection is disposed along the outer circumference of the light irradiation section.

As described above, the pixel electrode connections are disposed along the outer circumference of the light irradiation section. Consequently, since a distance from a short side facing each other to the pixel electrode connection in the pixel electrode can be shorter as much as possible, a resistance that occurs in the pixel electrode can be reduced, thereby enabling a stable operation.

Moreover, even in this case, the pixel electrode connections for electrically connecting the pixel electrode and the driver element are disposed outside the light irradiation section. As a result, a linear shadow caused by the pixel electrode connection is not generated unlike the conventional art, and nonuniformity of a reflection does not occur, thereby enabling a light to be reflected uniformly.

The optical modulation apparatus in accordance with the present invention is characterized in that a pixel electrode connection disposed close to the outer circumference of the light irradiation section and a pixel electrode connection disposed separately from the outer circumference of the light irradiation section are arranged in alternate shifts along the outer circumference of the light irradiation section.

By the above configuration, even in the state in which the outer circumference of the light irradiation section blurs, the pixel electrode connections for electrically connecting the pixel electrode and the driver element are disposed outside the light irradiation section in many sections. As a result, a linear shadow caused by the pixel electrode connection is not generated unlike the conventional art, and nonuniformity of a reflection does not occur, thereby enabling a light to be reflected uniformly.

The optical modulation apparatus in accordance with the present invention is characterized in that the pixel electrode connections in the pixel electrodes disposed adjacently to each other in a long side direction are not disposed adjacently to each other.

By the above configuration, even in the state in which the outer circumference of the light irradiation section blurs, the pixel electrode connections for electrically connecting the pixel electrode and the driver element are disposed outside the light irradiation section in many sections. As a result, a linear shadow caused by the pixel electrode connection is not generated unlike the conventional art, and nonuniformity of a reflection does not occur, thereby enabling a light to be reflected uniformly.

The optical modulation apparatus in accordance with the present invention is characterized in that two pixel electrode connections are disposed in each pixel electrode.

Since two pixel electrode connections are disposed in each pixel electrode as described above, each pixel electrode can be reliably driven.

The optical modulation apparatus in accordance with the present invention is characterized in that the pixel electrode connection is disposed close to a short side which is opposite to short sides facing each other in the pixel electrodes.

Since the pixel electrode connection is disposed close to a short side which is opposite to short sides facing each other in the pixel electrodes as described above, the pixel electrode connections for electrically connecting the pixel electrode and the driver element are disposed reliably outside the light irradiation section. As a result, a linear shadow caused by the pixel electrode connection is not generated at all unlike the conventional art, and nonuniformity of a reflection does not occur, thereby enabling a light to be reflected uniformly.

By the present invention, the pixel electrode connections for electrically connecting the pixel electrode and the driver element are disposed outside the light irradiation section. As a result, a linear shadow caused by the pixel electrode connection is not generated unlike the conventional art, and nonuniformity of a reflection does not occur, thereby enabling a light to be reflected uniformly.

Moreover, a malfunction of the driver element caused by a leak of a light from a part around the pixel electrode connection can be prevented.

As a result, a phase of each wavelength can be aligned with precision, and an optical transmission can be reliably carried out as an optical modulation apparatus.

BRIEF DESCRIPTION OF THE DRAWINGS

FIG. 8(*a*) is a plan view, and FIG. 8(*b*) is a cross-sectional view taken along the line B-B' of FIG. 8(*a*)

BEST MODE OF CARRYING OUT THE INVENTION

An embodiment (example) in accordance with the present invention will be described below in detail with reference to the drawings.

In the following descriptions, an explanation of a section that is not related to the present invention (for instance, a structure for sealing a liquid crystal layer disposed above the pixel electrode) will be omitted.

Moreover, the same elements illustrated in the figures are numerically numbered similarly.

Embodiment 1

Figure 1:
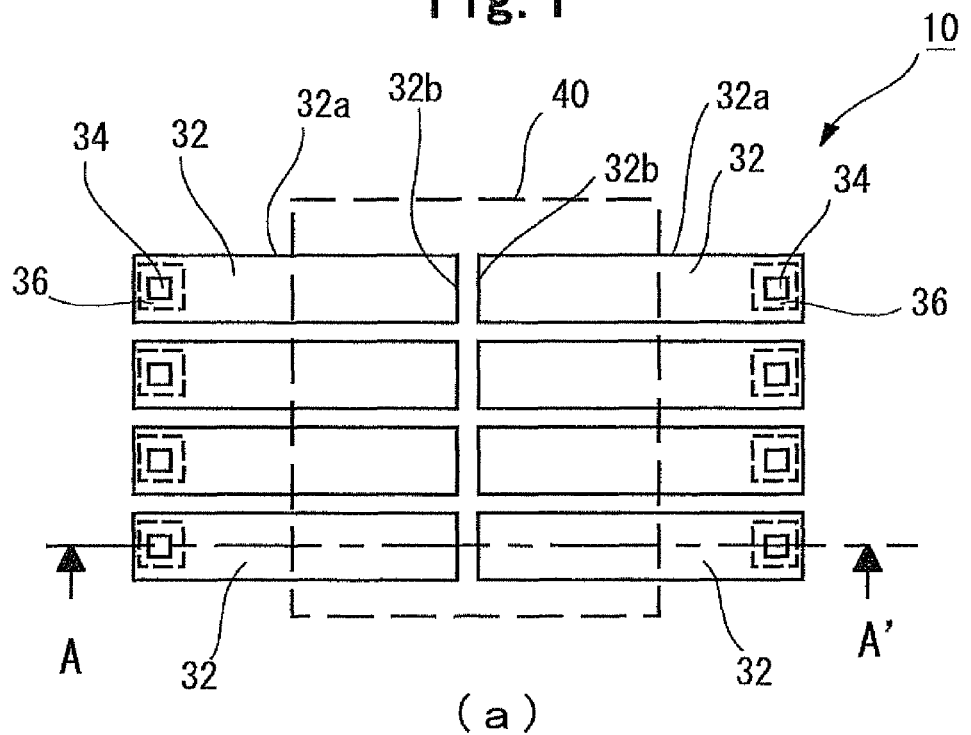
FIG. 1(*a*) is a plan view showing a light irradiation section in which the pixel electrodes of an optical modulation apparatus in accordance with the present invention are disposed, and FIG. 1(*b*) is a cross-sectional view taken along the line A-A' of FIG. 1(*a*)
Figure 1:
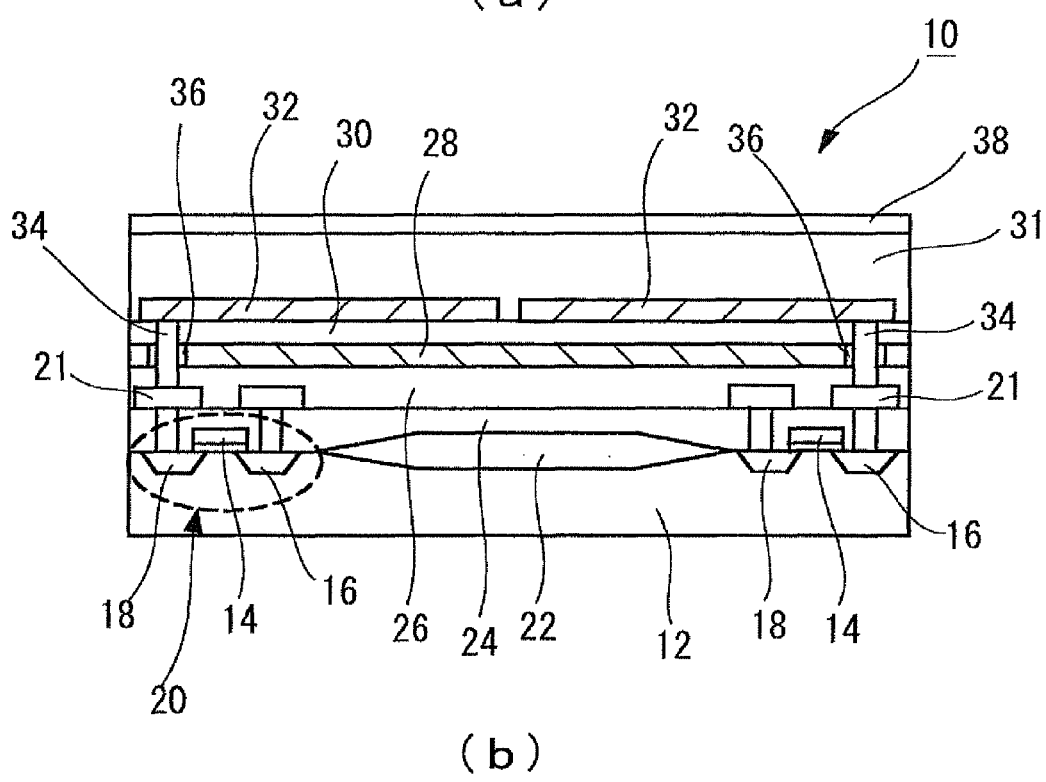

[Explanation of a First Embodiment in Accordance with the Present Invention: FIG. 1]

A first embodiment of an optical modulation apparatus in accordance with the present invention will be described below with reference to FIG. 1.

FIG. 1(*a*) is a plan view showing a light irradiation section in which the pixel electrodes of an optical modulation apparatus in accordance with the present invention are disposed, and FIG. 1(*b*) is a cross-sectional view taken along the line A-A' of FIG. 1(*a*).

In FIGS. 1(*a*) and 1(*b*), a numeral 10 indicates an optical modulation apparatus in which an LCOS in accordance with the present invention is used in the whole of the configuration.

In the optical modulation apparatus 10, a gate electrode 14 is formed on a substrate 12, and a drain region 16 and a source region 18 are formed around the gate electrode 14. The gate electrode 14, the drain region 16, and the source region 18 configure a driver element 20 of a MOS type transistor.

The driver elements 20 of MOS type transistors are electrically insulated and isolated by an element isolation region 22, and are electrically insulated and isolated by interlayer insulation films 24 and 26.

An optical protective film (a light shielding layer) 28 is formed on the upper surface of the interlayer insulation film 26, and a pixel electrode 32 is formed on the upper surface of the optical protective film (the light shielding layer) 28 via an interlayer insulation film 30.

The pixel electrode 32 and the driver element 20 disposed below the pixel electrode 32 are electrically connected to each other. That is to say, a wire 21 of the driver element 20 and the lower surface of the pixel electrode 32 are electrically connected to each other via a pixel electrode connection 34.

In this case, the pixel electrode connection 34 penetrates through a hole formed in the optical protective film (the light shielding layer) 28. A gap is formed between the pixel electrode connection 34 and an opening part formed in the optical protective film (the light shielding layer) 28. A slit 36 is formed around the pixel electrode connection 34.

Moreover, a liquid crystal layer 38 as an optical modulation substance is formed on the upper surface of the pixel electrode 32 via the final protective film 31. A counter electrode (a transparent electrode) (not shown) is formed on the upper surface of the liquid crystal layer 38.

As an optical modulation substance, a substance having an electro-optic effect can be used. In addition to a liquid crystal, an optical crystal having an electro-optic effect such as lithium niobate ($LiNbO_3$) can be used.

A silicon semiconductor substrate can be used as a substrate 12. The drain region 16 and the source region 18 are diffusion regions that are formed by adding impurities into the substrate 12. The gate electrode 14 can be made of polysilicon or the like. The MOS type transistor is a driver element 20 and is connected to another circuit system (not shown) via the wire 21. One driver element 20 is formed for one pixel electrode on a one-on-one basis. The driver elements 20 are isolated by the element isolation region 22 formed on the substrate 12.

The wire 21 is connected to the pixel electrode 32 via the pixel electrode connection 34. The wire 21 is isolated from the optical protective film (the light shielding layer) 28 and the pixel electrode 32 by interlayer insulation films 24, 26, and 30.

The optical protective film (the light shielding layer) 28 can be configured by a material equivalent to that of the pixel electrode 32. For instance, a metal such as aluminum and copper can be used as the material. To prevent the optical protective film (the light shielding layer) 28 and the wire 21 and so on from coming into contact with each other, a slight gap is formed around the pixel electrode connection 34. The gap is a slit 36.

The final protective film 31 is formed on the pixel electrode 32. As the final protective film 31, a well known TEOS (tetraethoxysilane) film can be used for instance. Moreover, a liquid crystal layer 38 is formed on the upper surface of the final protective film 31. The liquid crystal layer 38 is sealed. Furthermore, a substrate provided with an electrode (a counter electrode (a transparent electrode)) is formed on the liquid crystal layer 38. However, the explanation of the substrate is omitted.

It is not always necessary to form the final protective film 31 on the pixel electrode 32. Depending on a reflectance of the pixel electrode 32 and a liquid crystal material to be used, the liquid crystal layer 38 can be formed on the upper surface of the pixel electrode 32 without forming the final protective film 31. Various changes and modifications can be thus made as needed.

As shown in FIG. 1, the pixel electrode 32 is a rectangular electrode having a long side 32a and a short side 32b. The pixel electrodes 32 are arranged on two lines separately at regular intervals in parallel with the substrate 12 in such a manner that short sides 32b of adjacent pixel electrodes 32 face each other.

Lights are irradiated to a region in which the pixel electrodes 32 are disposed. The area is composed of a plurality of pixel electrodes 32. A light irradiation section 40 in a generally rectangular shape is formed in the area in the embodiment shown in FIG. 1. As a matter of course, a size of the light irradiation section 40 can be determined without any inhibition depending on the specifications of the optical modulation apparatus.

For the pixel electrode 32, the sizes of a long side 32a and a short side 32b are determined corresponding to a size of the light irradiation section 40 in a practical sense. For instance, a long side 32a is 1 mm and a short side 32b is 5 µm. In the example shown in FIG. 1, the sizes of the long side and the short side are modified, and eight pixel electrodes 32 are arranged to improve visualization of the figure.

A flatness of the pixel electrode 32 should be improved since it is necessary that lights that have been irradiated to the light irradiation section 40 are uniformly reflected. Consequently, although this is not restricted in particular, the well known CMP (Chemical Mechanical Polishing) technology should be used to flatten the surface of the pixel electrode 32.

The pixel electrode 32 and the driver element 20 that drives the pixel electrode 32 and that is disposed below the pixel electrode 32 are connected to each other via the pixel electrode connection 34.

The light irradiation section 40 is an area in which a plurality of pixel electrodes 32 is arranged. The pixel electrode connection 34 is disposed outside the area.

In other words, the pixel electrode connection 34 is disposed close to a short side 32b which is opposite to short sides 32b facing each other in the pixel electrodes 32.

Consequently, as shown in FIG. 1, pixel electrodes 32 are arranged in an orderly fashion, and the pixel electrode connections 34 for connecting the pixel electrode 32 and the driver element 20 to each other are also arranged in an orderly fashion. However, since the line of the pixel electrode connections 34 are disposed outside the area of the light irradiation section 40, a linear shadow is not generated in the light irradiation section 40. That is, nonuniformity of lights does not occur in the light irradiation section 40.

In the embodiment in accordance with the present invention, a slit 36 is also formed around the pixel electrode connection 34. The slit 36 is a slight opening portion of the optical protective film (the light shielding layer) 28 for a connection to the driver element 20. The driver element 20 is located directly below the slit 36. However, since slit 36 is disposed outside the area of the light irradiation section 40 to which a light is irradiated, even in the case in which a high-intensity light is irradiated, the light does not enter the slit 36, thereby preventing a malfunction of the driver element 20.

The optical modulation apparatus in accordance with the embodiment of the present invention is characterized by the pixel electrode connection 34 for connecting the disposed pixel electrode 32 and the driver element 20 to each other. The pixel electrode connections 34 of the adjacent pixel electrodes 32 are located separately at the edges outside the light irradiation section 40.

In other words, the pixel electrode connection 34 is disposed close to a short side 32b which is opposite to short sides 32b facing each other in the pixel electrodes 32.

By the above configuration, a linear shadow caused by the pixel electrode connection 34 is not generated unlike the conventional art.

Moreover, the driver element 20 is formed on a plane different from the pixel electrode 32, for instance, the driver element 20 is formed on the surface of the semiconductor substrate 12, and the optical protective film (the light shielding layer) 28 is disposed between the driver element 20 and the pixel electrode 32. The pixel electrode connection 34 is disposed in a section outside the light irradiation section 40. Consequently, even in the case in which the driver element 20 is located directly below the pixel electrode 32 in the light irradiation section 40 for instance, since the pixel electrode connection 34 is disposed in a section outside the light irradiation section 40, a leak of a light caused by an irradiation of a high-intensity light does not reach the driver element 20, thereby preventing a malfunction of the driver element 20.

Embodiment 2

Figure 2:
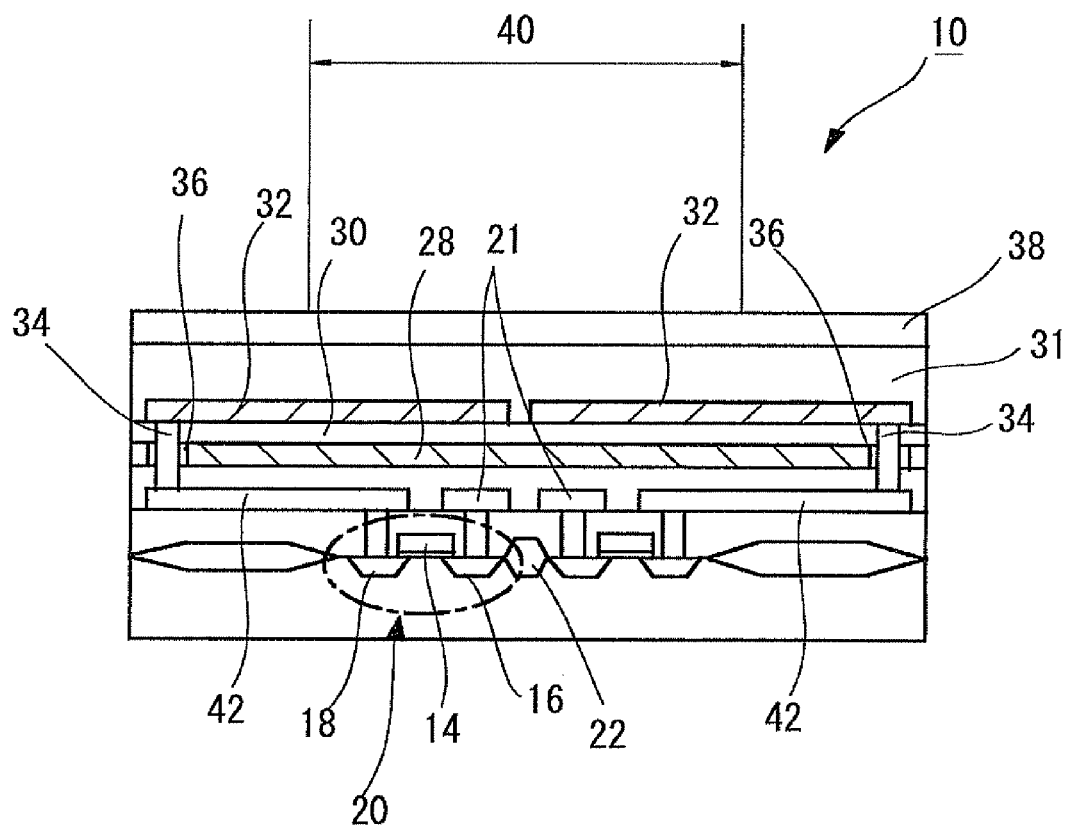
FIG. 2 is a cross-sectional view illustrating a second embodiment of an optical modulation apparatus in accordance with the present invention, and is viewed in a direction equivalent to that shown in FIG. 1(*b*)

[Explanation of a Second Embodiment in Accordance with the Present Invention: FIG. 2]

A second embodiment of an optical modulation apparatus in accordance with the present invention will then be described below with reference to FIG. 2.

FIG. 2 is a cross-sectional view schematically illustrating a cross-section of an optical modulation apparatus in accordance with the present invention, and is viewed in a direction equivalent to that shown in FIG. 1(b).

The optical modulation apparatus 10 in accordance with this embodiment has a configuration basically similar to that of the optical modulation apparatus 10 shown in FIG. 1. Here, elements equivalent to those illustrated in FIG. 1 are numerically numbered similarly and the detailed descriptions of the equivalent elements are omitted.

A difference between the second embodiment in accordance with the present invention shown in FIG. 2 and the first embodiment in accordance with the present invention shown in FIG. 1 is an arrangement of the driver elements 20. In the configuration shown in FIG. 2, the driver elements 20 are located in the area of the light irradiation section 40.

The driver elements 20 are located in the area of the light irradiation section 40, and the pixel electrode connections 34 that are parts connected to the pixel electrode 32 are located in a section outside the light irradiation section 40. However, the driver element 20 and the pixel electrode connection 34 are connected to each other by using an auxiliary wire 42.

As described above, the auxiliary wire 42 is formed on the interlayer insulation film 24. Consequently, the driver element 20 can be disposed at any position below the optical protective film (the light shielding layer) 28.

Embodiment 3

Figure 3:
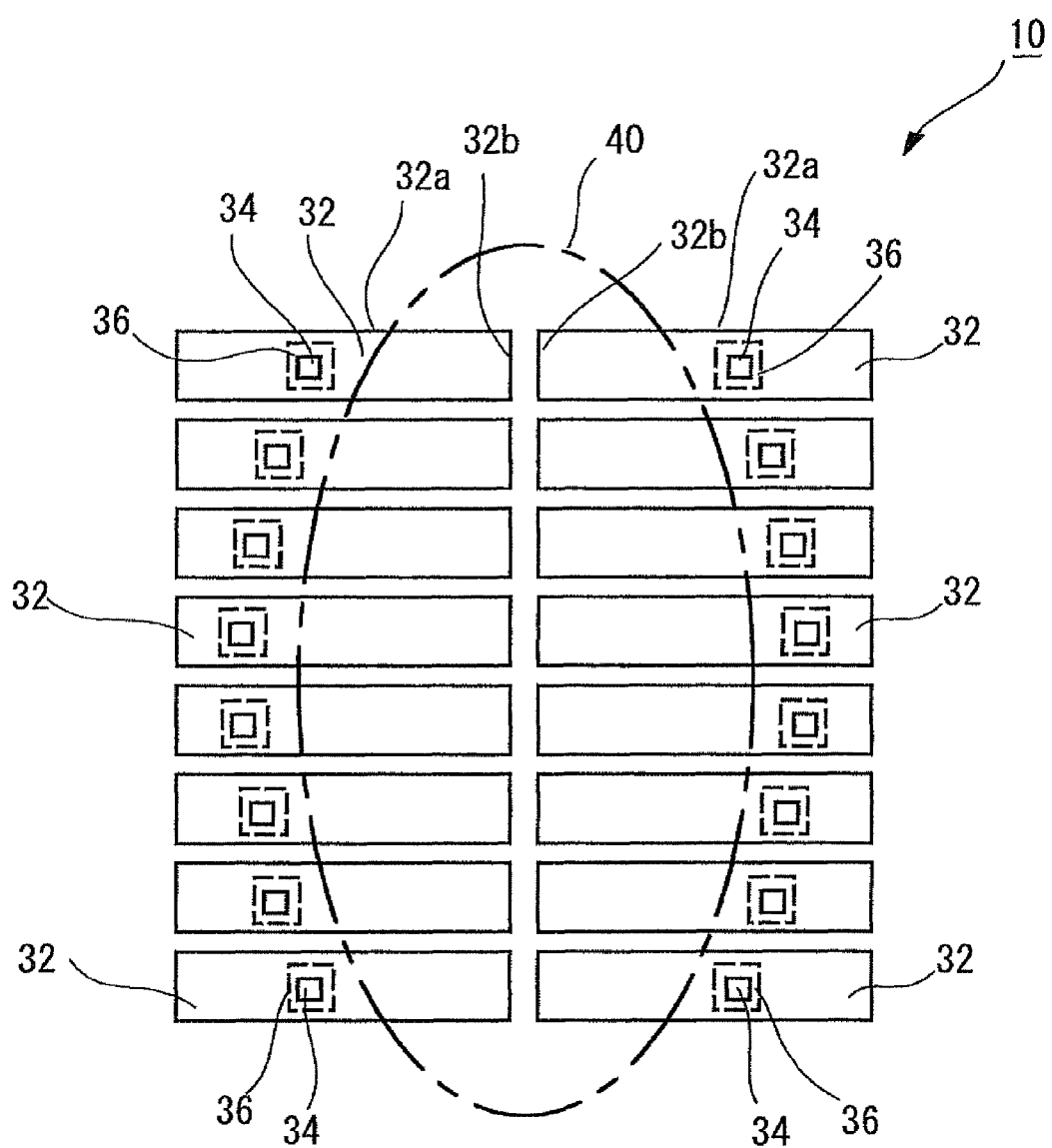
FIG. 3 is a plan view schematically showing a cross section illustrating a third embodiment of an optical modulation apparatus in accordance with the present invention, and is viewed in a direction equivalent to that shown in FIG. 1(*a*)

[Explanation of a Third Embodiment in Accordance with the Present Invention: FIG. 3]

A third embodiment of an optical modulation apparatus in accordance with the present invention will then be described below with reference to FIG. 3.

FIG. 3 is a plan view schematically illustrating a cross-section of an optical modulation apparatus in accordance with the present invention, and is viewed in a direction equivalent to that shown in FIG. 1(a).

The optical modulation apparatus 10 in accordance with this embodiment has a configuration basically similar to that of the optical modulation apparatus 10 shown in FIG. 1. Here, elements equivalent to those illustrated in FIG. 1 are numerically numbered similarly and the detailed descriptions of the equivalent elements are omitted.

For the optical modulation apparatus 10 in accordance with this embodiment, the light irradiation section 40 is a light irradiation section in an elliptical shape as shown in FIG. 3.

As described earlier, the pixel electrode 32 is selected corresponding to a size of the light irradiation section 40. As the size of the light irradiation section 40 is larger, a resistance component of the pixel electrode 32 itself becomes a problem.

In other words, the pixel electrode 32 is made of a metal or the like, and in the case in which a size of the pixel electrode 32 is larger, a resistance component thereof cannot be ignored. In the case in which the pixel electrode 32 is driven at a higher speed, it becomes a problem.

That is to say, since it is regarded for a resistance component to be added to a drive path (the drain region 16) of the driver element 20, a delay may occur for the application of a voltage to the pixel electrode 32 in some cases.

For the optical system of an instrument in which the optical modulation apparatus in accordance with the present invention is installed, the light irradiation section is in an elliptical shape in many cases. This is because a light irradiation apparatus provided with a circular lens and a circular aperture is used in many cases.

As shown in FIG. 3, the pixel electrode connections 34 are disposed corresponding to the shape of the light irradiation section 40 and outside the area of the light irradiation section 40. The pixel electrode connections 34 are arranged in such a manner that the pixel electrode connections 34 form into an arch in a plan view. That is to say, the pixel electrode connections 34 are disposed along the outer circumference of the light irradiation section 40 and outside the light irradiation section 40.

For the pixel electrode 32, a long side 32a is several mm and a short side 32b is several µm. Consequently, it is well-balanced that the pixel electrode connection 34 is disposed around the center of the long side of the pixel electrode 32. The center part is in the area of the light irradiation section 40. However, by the configuration shown in FIG. 3, a resistance component can be reduced although a resistance is added as compared with the case in which the pixel electrode connection 34 is disposed around the center of the long side of the pixel electrode 32.

For the driver element 20 in the configuration shown in FIG. 3, the drive ability thereof can be modified corresponding to the position of the pixel electrode connection 34 formed in the pixel electrode 32 connected to the driver element 20.

As described above, the pixel electrode connections 34 are disposed along the outer circumference of the light irradiation section 40. Consequently, since a distance from a short side 32b facing each other to the pixel electrode connection 34 in the pixel electrode 32 can be shorter as much as possible, a resistance that occurs in the pixel electrode 32 can be reduced, thereby enabling a stable operation.

Moreover, even in this case, the pixel electrode connections 34 for electrically connecting the pixel electrode 32 and the driver element 20 are disposed outside the light irradiation section 40. As a result, a linear shadow caused by the pixel electrode connection is not generated unlike the conventional art, and nonuniformity of a reflection does not occur, thereby enabling a light to be reflected uniformly.

Embodiment 4

Figure 4:
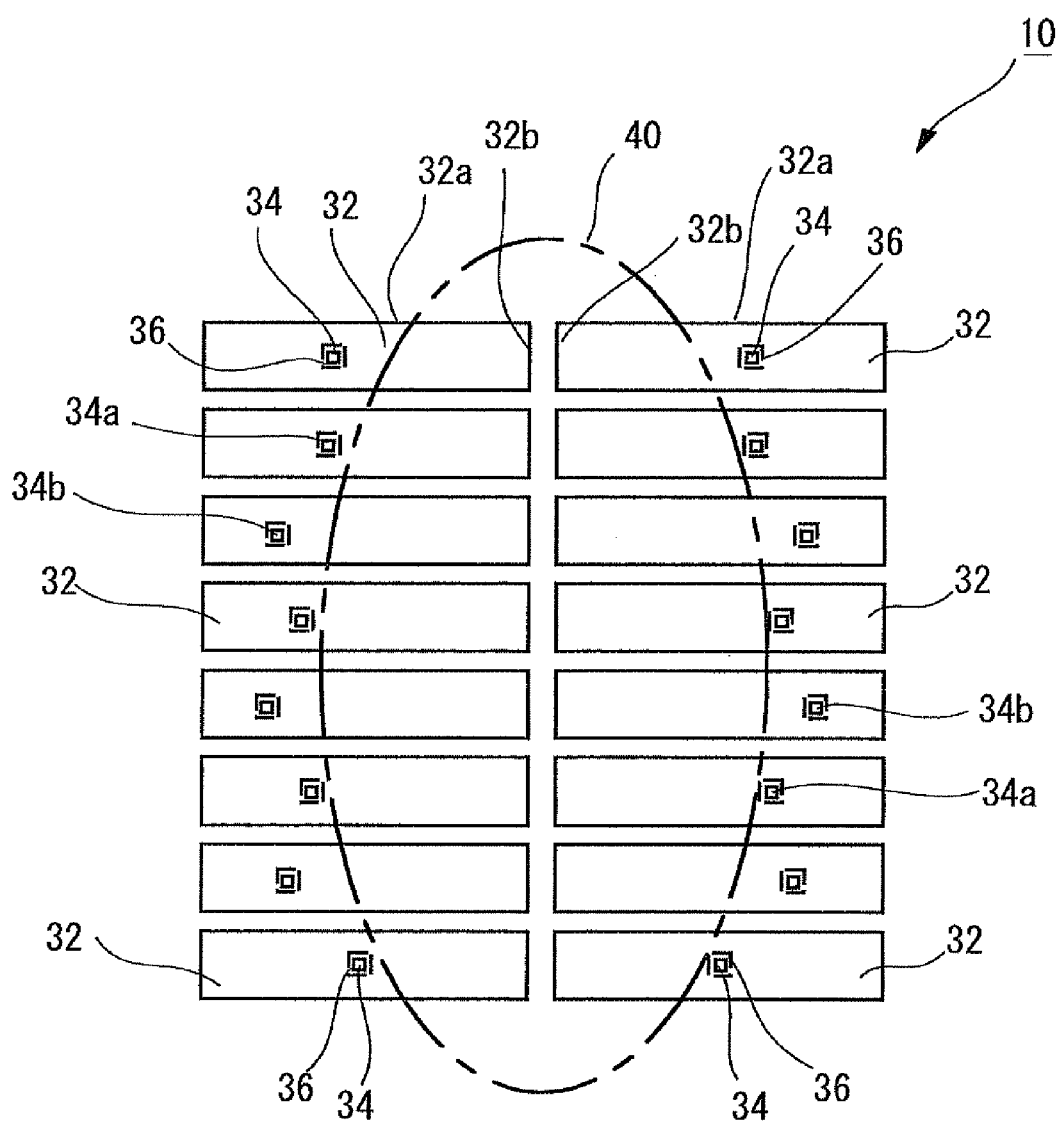
FIG. 4 is a plan view schematically showing a cross section of an optical modulation apparatus in accordance with the present invention, and is viewed in a direction equivalent to that shown in FIG. 1(*a*)

[Explanation of a Fourth Embodiment in Accordance with the Present Invention: FIG. 4]

A fourth embodiment of an optical modulation apparatus in accordance with the present invention will then be described below with reference to FIG. 4.

FIG. 4 is a plan view schematically illustrating a cross-section of an optical modulation apparatus in accordance with the present invention, and is viewed in a direction equivalent to that shown in FIG. 1(a).

The optical modulation apparatus 10 in accordance with this embodiment has a configuration basically similar to that of the optical modulation apparatus 10 shown in FIG. 1. Here, elements equivalent to those illustrated in FIG. 1 are numerically numbered similarly and the detailed descriptions of the equivalent elements are omitted.

For the optical modulation apparatus 10 in accordance with this embodiment, similarly to the embodiment 3 shown in FIG. 3, the light irradiation section 40 is a light irradiation section in an elliptical shape as shown in FIG. 4.

Moreover, as shown in FIG. 4, the pixel electrode connections 34 are disposed along the outer circumference of the light irradiation section 40. More specifically, a pixel electrode connection 34a is disposed close to the outer circumference of the light irradiation section 40, and a pixel electrode connection 34b is disposed separately from the outer circumference of the light irradiation section 40. The pixel electrode connection 34a and the pixel electrode connection 34b are disposed in alternate shifts in a zigzag pattern.

By this configuration, even in the state in which the outer circumference of the light irradiation section 40 blurs, the pixel electrode connections 34 for electrically connecting the pixel electrode 32 and the driver element 20 are disposed outside the light irradiation section 40 in many sections. As a result, a linear shadow caused by the pixel electrode connection is not generated unlike the conventional art, and nonuniformity of a reflection does not occur, thereby enabling a light to be reflected uniformly.

In this case, for the optical modulation apparatus 10 in accordance with this embodiment, a pixel electrode connection 34a disposed close to the outer circumference of the light irradiation section 40 and a pixel electrode connection 34b disposed separately from the outer circumference of the light irradiation section 40 are arranged in alternate shifts one by one in a zigzag pattern. However, although this is not shown in the figure, the arrangement can be modified as needed, for instance, the pixel electrode connection 34a and the pixel electrode connection 34b can be disposed in alternate shifts two by two or the group of two pixel electrode connections 34a and the group of two pixel electrode connections 34b can be arranged in alternate shifts one by one in a zigzag pattern (the same pattern can also be applied to the following embodiment 6).

Embodiment 5

Figure 5:
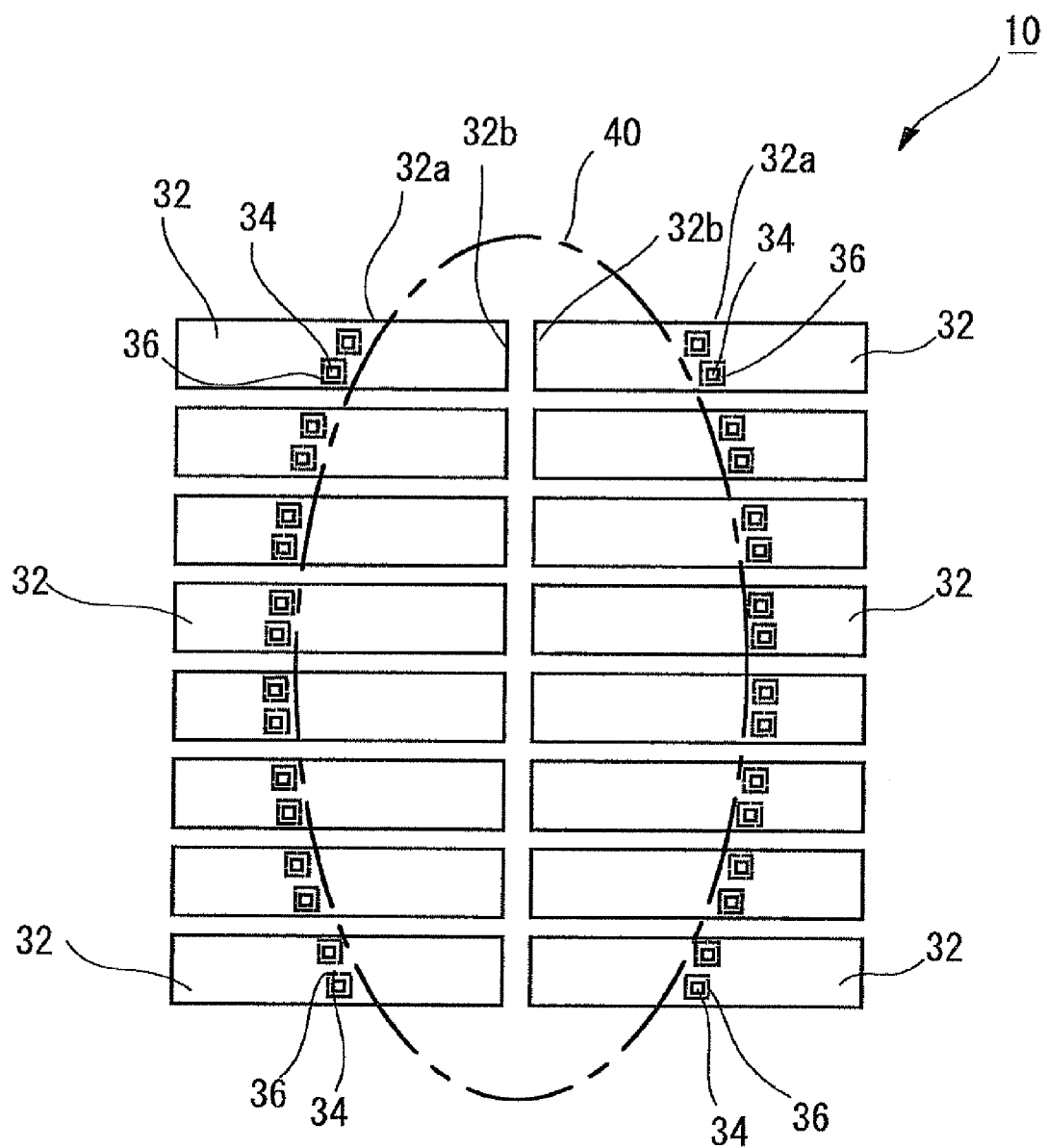
FIG. 5 is a plan view schematically showing a cross section of an optical modulation apparatus in accordance with the present invention, and is viewed in a direction equivalent to that shown in FIG. 1(*a*)

[Explanation of a Fifth Embodiment in Accordance with the Present Invention: FIG. 5]

A fifth embodiment of an optical modulation apparatus in accordance with the present invention will then be described below with reference to FIG. 5.

FIG. 5 is a plan view schematically illustrating a cross-section of an optical modulation apparatus in accordance with the present invention, and is viewed in a direction equivalent to that shown in FIG. 1(a).

The optical modulation apparatus 10 in accordance with this embodiment has a configuration basically similar to that of the optical modulation apparatus 10 shown in FIG. 1. Here, elements equivalent to those illustrated in FIG. 1 are numerically numbered similarly and the detailed descriptions of the equivalent elements are omitted.

For the optical modulation apparatus 10 in accordance with this embodiment, similarly to the embodiment 3 shown in FIG. 3, the light irradiation section 40 is a light irradiation section in an elliptical shape as shown in FIG. 5. Moreover, the pixel electrode connections 34 are disposed along the outer circumference of the light irradiation section 40.

For the optical modulation apparatus 10 in accordance with this embodiment, two pixel electrode connections 34 are disposed in one pixel electrode 32.

Since two pixel electrode connections 34 are disposed in each pixel electrode 32 as described above, parts that electrically connect the pixel electrode 32 and the driver element 20 are increased as a result, thereby reliably driving each pixel electrode 32.

Embodiment 6

Figure 6:
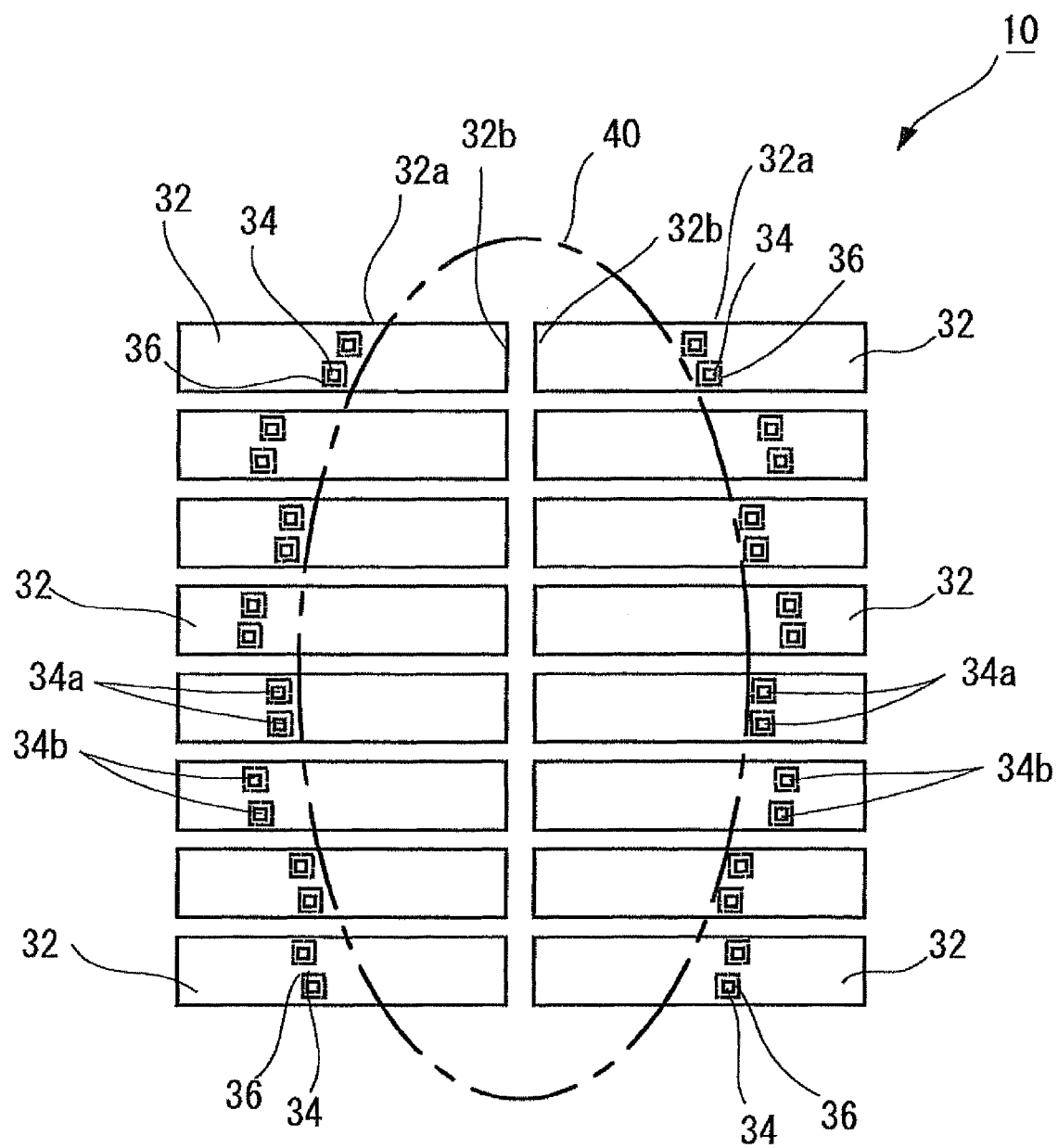
FIG. 6 is a plan view schematically showing a cross section of an optical modulation apparatus in accordance with the present invention, and is viewed in a direction equivalent to that shown in FIG. 1(*a*)
Figure 7:
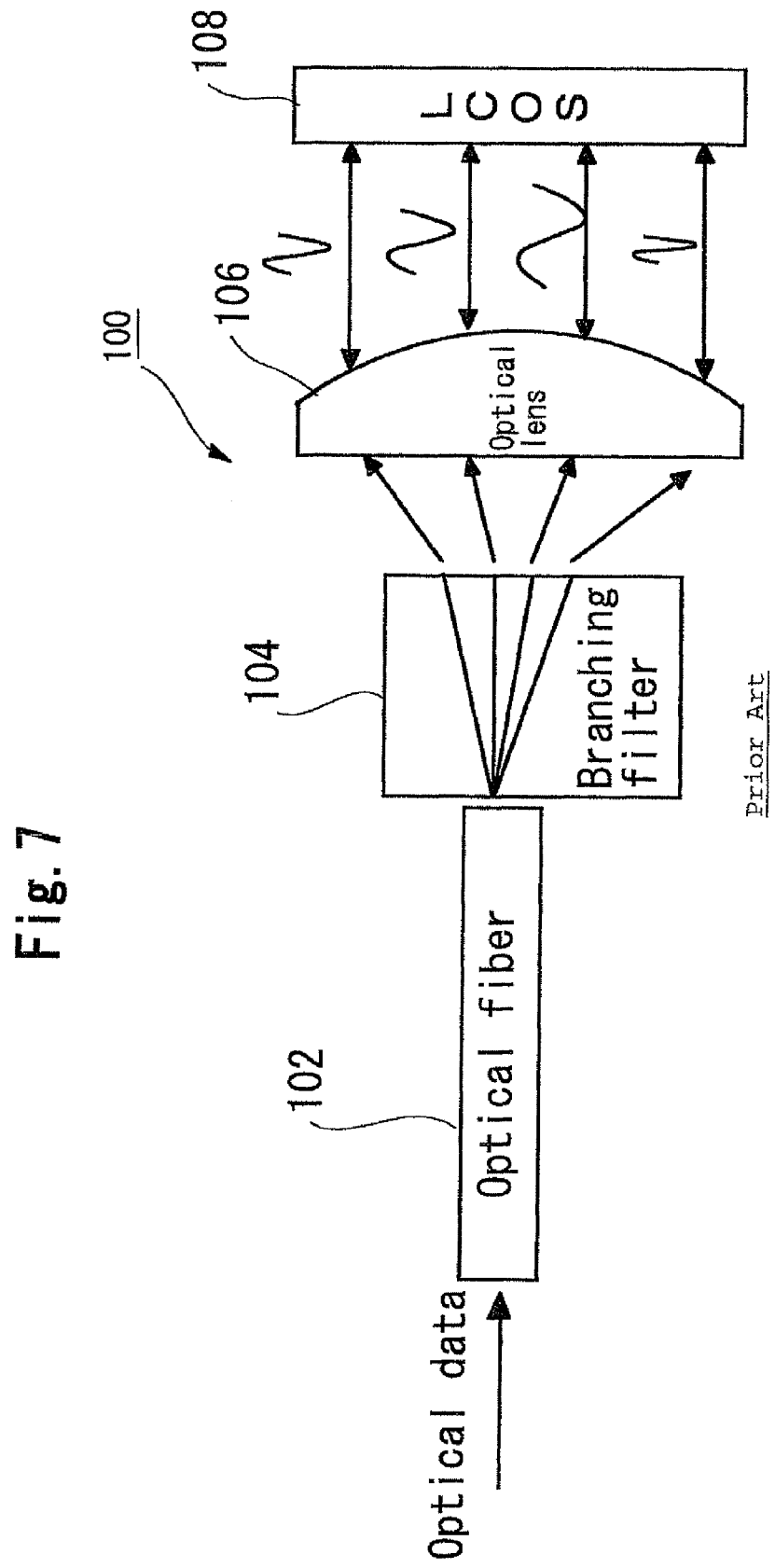
FIG. 7 is a schematic view for illustrating a tunable optical dispersion compensator (TODC)
Figure 8:
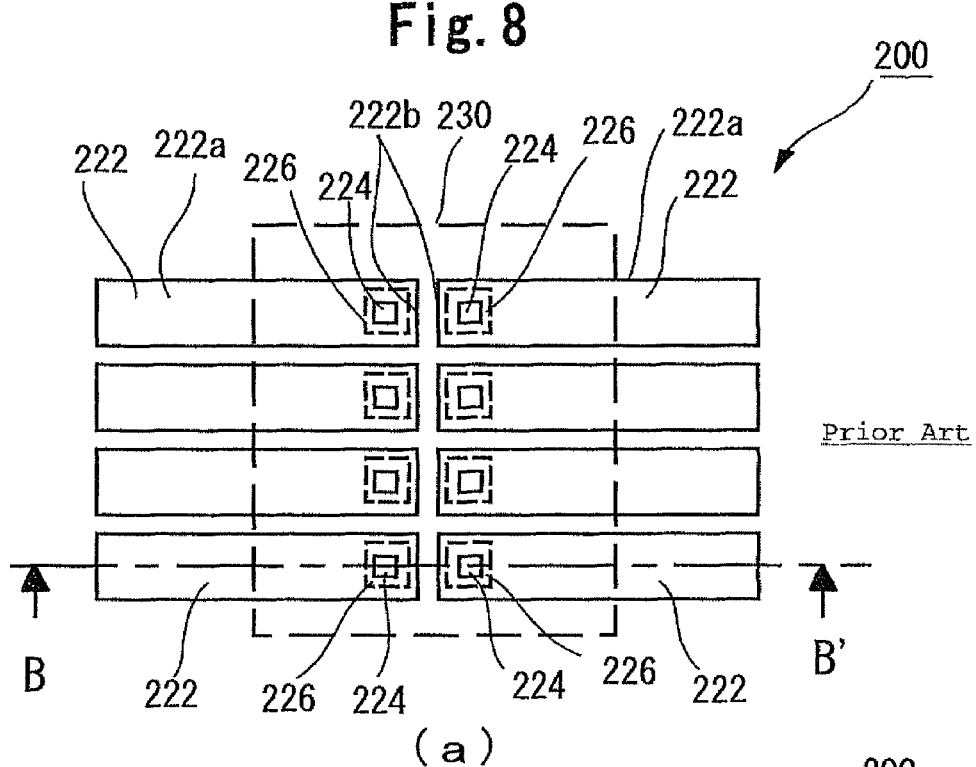
FIG. 8 is a schematic view for illustrating an LCOS having a large pixel region for describing the conventional problems.
Figure 8:
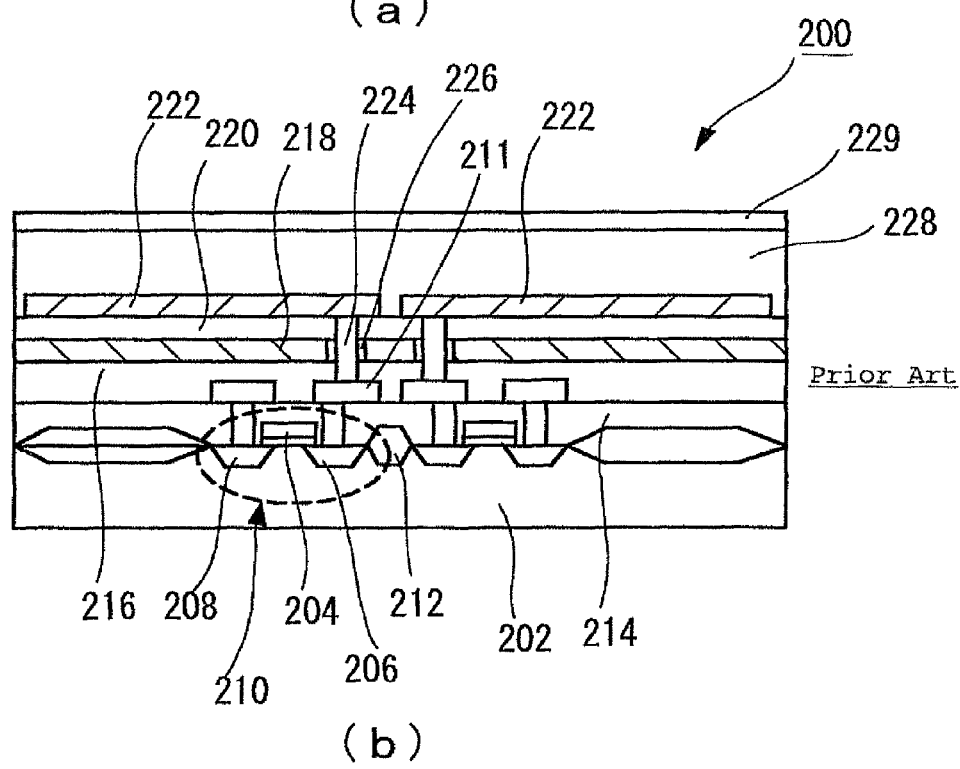
Figure 9:
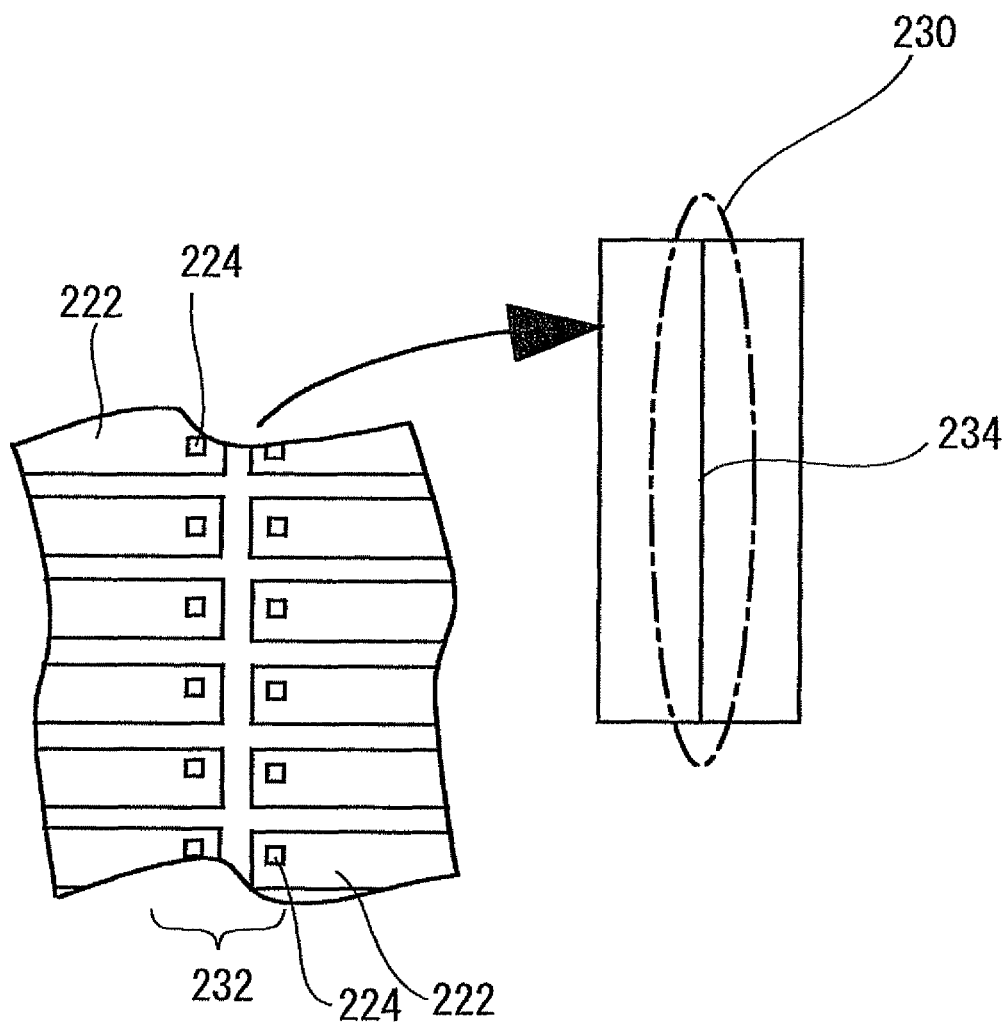
FIG. 9 is a plan view schematically illustrating a display region shown in FIG. 8.

[Explanation of a Sixth Embodiment in Accordance with the Present Invention: FIG. 6]

A sixth embodiment of an optical modulation apparatus in accordance with the present invention will then be described below with reference to FIG. 6.

FIG. 6 is a plan view schematically illustrating a cross-section of an optical modulation apparatus in accordance with the present invention, and is viewed in a direction equivalent to that shown in FIG. 1(a).

The optical modulation apparatus 10 in accordance with this embodiment has a configuration basically similar to that of the optical modulation apparatus 10 shown in FIG. 1. Here, elements equivalent to those illustrated in FIG. 1 are numerically numbered similarly and the detailed descriptions of the equivalent elements are omitted.

For the optical modulation apparatus 10 in accordance with this embodiment, similarly to the embodiment 3 shown in FIG. 3, the light irradiation section 40 is a light irradiation section in an elliptical shape as shown in FIG. 6.

Moreover, similarly to the embodiment 4 shown in FIG. 4, the pixel electrode connections 34 are disposed along the outer circumference of the light irradiation section 40 as shown in FIG. 6. More specifically, a pixel electrode connection 34a is disposed close to the outer circumference of the light irradiation section 40, and a pixel electrode connection 34b is disposed separately from the outer circumference of the light irradiation section 40. The pixel electrode connection 34a and the pixel electrode connection 34b are disposed in alternate shifts in a zigzag pattern.

For the optical modulation apparatus 10 in accordance with this embodiment, two pixel electrode connections 34 are disposed in one pixel electrode 32 similarly to the embodiment 5 shown in FIG. 5.

By this configuration, even in the state in which the outer circumference of the light irradiation section 40 blurs, the pixel electrode connections 34 for electrically connecting the pixel electrode 32 and the driver element 20 are disposed outside the light irradiation section 40 in many sections. As a result, a linear shadow caused by the pixel electrode connection is not generated unlike the conventional art, and nonuniformity of a reflection does not occur, thereby enabling a light to be reflected uniformly.

Since two pixel electrode connections 34 are disposed in each pixel electrode 32 as described above, each pixel electrode 32 can be reliably driven.

In the above embodiments 3 to 6, the light irradiation section 40 is a light irradiation section in an elliptical shape. However, similarly to the embodiment 1 shown in FIG. 1, the light irradiation section 40 can be in a generally rectangular shape. Moreover, in the elementary sense, the present invention can also be applied to the case in which the light irradiation section 40 is in another shape.

While the embodiments in which the driver element is disposed below the pixel electrode have been described above for the optical modulation apparatus in accordance with the present invention, the present invention is not restricted to the embodiments, and various changes, modifications, and functional additions can be thus made without departing from the scope of the present invention. For instance, the driver element can be disposed at the position in which the driver element does not overlap with the pixel electrode in a plan view (further outside the light irradiation section).

For the optical modulation apparatus in accordance with the present invention, the pixel electrode connection is disposed outside the light irradiation section, thereby preventing a diffuse reflection of a light over the pixel electrode connection. Consequently, the optical modulation apparatus in accordance with the present invention can be used for an application that requires the reflection characteristics of high precision. Moreover, a malfunction of the driver element caused by a leak of a light can be prevented. Therefore, the optical modulation apparatus in accordance with the present invention can also be used for a laser instrument in which a high-intensity light energy is used.

What is claimed is:

1. An optical modulation apparatus comprising:
   a plurality of rectangular pixel electrodes that are arranged on two lines separately at regular intervals in such a manner that short sides of adjacent pixel electrodes face each other and that drive an optical modulation substance;
   a driver element that is disposed below the pixel electrode and that drives the pixel electrode; and
   a pixel electrode connection that electrically connects the pixel electrode and the driver element,
   wherein the pixel electrode has a light irradiation section,
   wherein the light irradiation section is the section of the pixel electrode that is irradiated by light,
   wherein the pixel electrode connection is disposed outside the light irradiation section, and
   wherein the light irradiation section is common to the plurality of rectangular pixel electrodes.

2. The optical modulation apparatus as defined in claim 1, wherein the pixel electrode connection is disposed along the outer circumference of the light irradiation section.

3. The optical modulation apparatus as defined in claim 2, wherein a pixel electrode connection disposed close to the outer circumference of the light irradiation section and a pixel electrode connection disposed separately from the outer circumference of the light irradiation section are arranged in alternate shifts along the outer circumference of the light irradiation section.

4. The optical modulation apparatus as defined in claim 1, wherein the pixel electrode connections in the pixel electrodes disposed adjacently to each other in a long side direction are not disposed adjacently to each other.

5. The optical modulation apparatus as defined in claim 1, wherein two pixel electrode connections are disposed in each pixel electrode.

6. The optical modulation apparatus as defined in claim 1, wherein the pixel electrode connection is disposed close to a short side which is opposite to short sides facing each other in the pixel electrodes.

7. The optical modulation apparatus as defined in claim 2, wherein two pixel electrode connections are disposed in each pixel electrode.

8. The optical modulation apparatus as defined in claim 3, wherein two pixel electrode connections are disposed in each pixel electrode.

9. The optical modulation apparatus as defined in claim 4, wherein two pixel electrode connections are disposed in each pixel electrode.

* * * * *